United States Patent

Monpetit

[15] 3,645,240
[45] Feb. 29, 1972

[54] ELECTRONIC CONTROL SYSTEM FOR INTERNAL COMBUSTION ENGINE INJECTORS

[72] Inventor: Louis A. Monpetit, L'Etang-la-Vill, France
[73] Assignee: Societe des Procedes Modernes d'Injection Sopromi, Les Mureau, France
[22] Filed: Feb. 11, 1970
[21] Appl. No.: 10,347

[30] Foreign Application Priority Data

Feb. 26, 1969 France...................................6904907

[52] U.S. Cl..........................123/32 EA, 123/119, 123/139 E
[51] Int. Cl.................................................F02d 5/00
[58] Field of Search...............123/32 EA, 32 AE, 119, 139 E

[56] References Cited

UNITED STATES PATENTS 3,456,628   7/1969   Bassot et al.........................123/32 EA Primary Examiner—Laurence M. Goodridge
Attorney—Kenyon & Kenyon Reilly Carr & Chapin

[57] ABSTRACT

Electronically controlled injector arrangements. An arrangement for adjusting the duration of injection into the cylinders of an internal combustion engine by means of signals produced by a bistable flip-flop controlled by the rotation of the engine, said signals defining the beginning and the end of the successive injections. The adjustment of the duration of injection is provided by delay means including a relaxation oscillator, the pulses produced by which are transformed into a train of rectangular high-frequency signals the duration of which is controlled by a main parameter governing the operation of the engine. These signals are then integrated and when a predetermined amplitude is reached, as defined by other parameters governing the operation of the engine, the end-of-injection signal is generated.

7 Claims, 5 Drawing Figures

3,645,240

INVENTOR
LOUIS MONPETIT
BY
Kenyon & Kenyon
ATTORNEY.

INVENTOR
LOUIS MONPETIT

ELECTRONIC CONTROL SYSTEM FOR INTERNAL COMBUSTION ENGINE INJECTORS

In U.S. Pat. No. 3,456,628, assigned to the assignee of this application there is described an arrangement for the electronic control of the injectors of internal combustion engines, said arrangement comprising a bistable flip-flop provided with at least two semiconductor components such as transistors or thyristors and adapted to control the beginning and end of the injection, the beginning being defined by a pulse fed into the electrode controlling one of the semiconductor components by a pulse generator associated with the rotation of the engine, while the end of the injection is controlled by a second pulse produced by delay means provided with a plurality of inputs and constituted by a unijunction transistor the emitter of which is connected with a condenser charged under a predetermined adjustable voltage through a resistance and the two bases of which are subjected to different voltages. Consequently, the second pulse is generated when the voltages at the emitter and the second base are equal except for a factor of proportionality. According to a feature of the above-mentioned patent specification, a relaxation oscillator is provided which is constituted by a unijunction transistor, a resistance and a variable low-capacity condenser and is adapted to transmit at the end of each relaxation period a pulse to the base of a transistor forming part of a monostable or bistable flip-flop circuit so as to produce signals of a constant peak value and of a varying frequency the value of which depends on the fundamental regulating parameter, said signals serving as means for charging the condenser of the delay means.

Since the relaxation period is caused to vary through the action of a variable low-capacity condenser, it was possible to obtain average relaxation frequencies of a magnitude of $10^5$ cycles.

The variable condenser described in the above-mentioned specification was constituted by two or more coaxial tubes adapted to slide axially with reference to one another and separated from one another by an insulating layer whereby a linear relationship was obtained between the shifting of said tubes and the duration of injection. It has been found however that the frequency of relaxation of the oscillator was not always sufficiently high for the production of a satisfactorily fine adjustment of the duration of injection under control of the different parameters governing the operation of the engine. Furthermore the variable condenser constituted by coaxial tubes required a comparatively large relative shifting of the electrodes which is not always an easy matter.

The present invention has for its object to remove the last-mentioned drawback. More specifically, it covers an electronic arrangement controlling the injecting procedure in accordance with the teachings of the above-mentioned prior specification and wherein, according to the present invention, the delay means includes a high-frequency relaxation oscillator, a system for shaping the high frequency signals into rectangular signals at the frequency of the relaxation oscillator, said signals being however of a variable duration depending on the operative parameters of the engine, said arrangement further including a system for integrating the rectangular signals and producing a signal ending the injection as soon as the integration of the rectangular signals has reached a predetermined value.

A further development of the present invention consists in providing a connection between the relaxation oscillator and the bistable flip-flop controlling the injection whereby said relaxation oscillator is triggered simultaneously with the signal defining the beginning of the injection and is cut off with the signal controlling the end of the injection.

According to a further modification, an electronic gate of the AND type is provided between the system shaping the high-frequency signals and the system integrating the rectangular signals, said gate being opened by the bistable flip-flop controlling the injection simultaneously with the signal starting the injection while it closes under the action of the signal controlling the end of the injection, the relaxation oscillator and the signal-shaping system being fed permanently so that the rectangular signals which are produced permanently can reach the integrating system only when the electronic gate is open.

By way of example and in order to further the understanding of the following description, reference is made to the accompanying drawings wherein.

Figure 1:
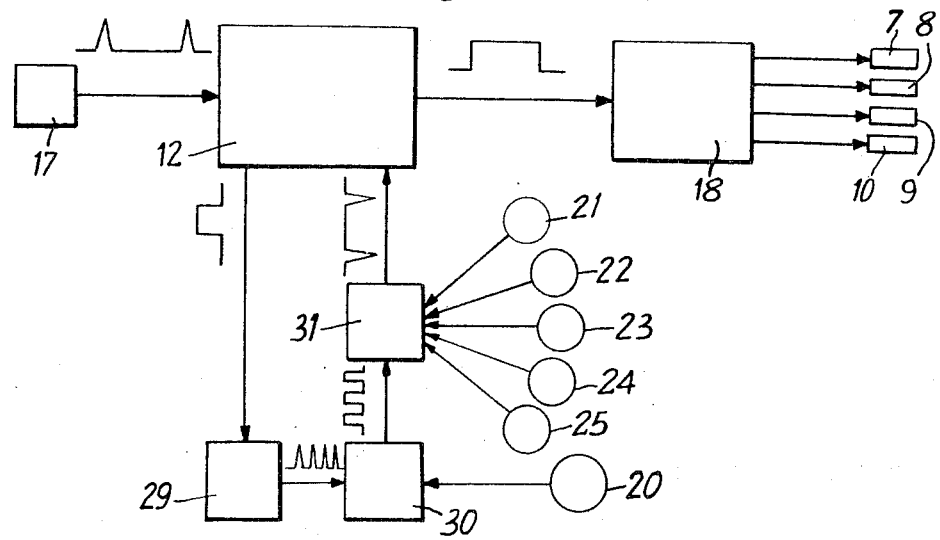
FIG. 1 is a simplified block diagram of an arrangement according to the present invention.

Turning to FIG. 1 of the drawings, it is apparent that the electromagnetically controlled injectors 7, 8, 9 and 10 are opened by rectangular electric signals the duration of which defines the amount of fuel injected, said signals being produced by a bistable flip-flop through the agency of a distributor 18 whenever the bistable flip-flop 12 is to control more than a single injector.

Said flip-flop 12 is triggered by pulses produced by a pulse generator 17 associated with the rotation of the engine, (not illustrated) and the flip-flop controls in the case illustrated in FIG. 1, a relaxation oscillator 29 operating at a high frequency as soon as it is triggered. The pulses produced by said oscillator 29 are transmitted to means 30 shaping the signals and transforming them into rectangular pulses at the same frequency, the duration of which varies however in relationship with a fundamental regulating parameter transmitted by the sensor 20. Said rectangular pulses are transmitted to an integrating system 31 producing the signal defining the end of the injection and cutting off the bistable flip-flop 12. The signal defining the end of injection is obtained when the integration of the rectangular pulses produced by the integrating system 30 provides a predetermined value which varies with the auxiliary correcting parameters transmitted by the sensors 21 to 25. In the case of spark ignition engines generally used in automobiles, the fundamental regulating parameter may be the reduced pressure in the intake manifold which reduced pressure is detected by the sensor 20. The auxiliary correction corresponding to charges in atmospheric pressure is detected by the sensor 21, the temperature of the engine is transmitted by the sensor 22, the temperature of the intake air by the sensor 23, the speed of depression of the pedal operating the throttle valve in the intake manifold by the sensor 24 and finally the rotary speed of the engine by the sensor 25. Consequently the duration of the rectangular signal produced by the bistable flip-flop 12 and controlling the injection corresponds accurately with the instantaneous requirements of the engine.

Figure 2:
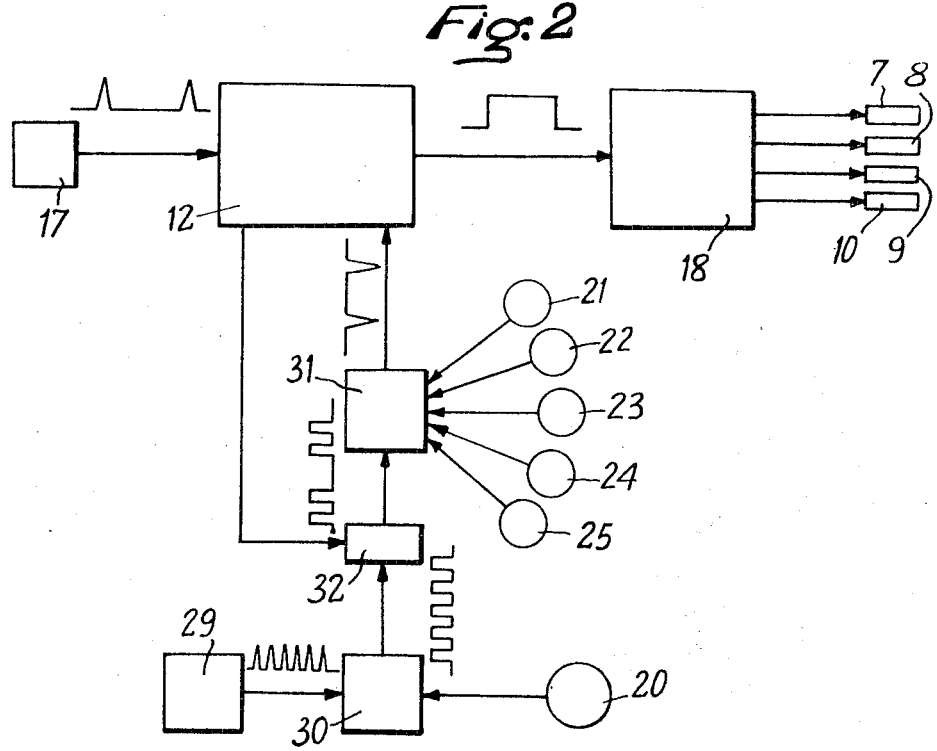
FIG. 2 is a simplified block diagram of a further embodiment of the invention.

In the case illustrated in FIG. 2, the relaxation oscillator 29 and also the system 30 shaping the signals are fed continuously by the supply of voltage as soon, for example as the ignition switch is closed while the rectangular signals of constant frequency but of variable duration are transmitted to the integrating system 31 through an electronic AND-gate 32 energized by the bistable flip-flop 12 synchronously with the rotation of the engine each time the flip-flop receives a signal corresponding to the beginning of the injection. This embodiment eliminates the uncertainties in operation which may occur each time the relaxation oscillator 29 is triggered. It also allows inter alia the use of a single oscillator 29 and of a signal-shaping system 30 controlled by a single sensor 20 for the transmission to any desired number of bistable flip-flops 12 of signals producing the end of the injection. Thus it is of particular advantage when the speed of rotation of the multicylinder engine rises to an extent such that the durations of injection overlap for the different engine cylinders. In such a case, it is possible to provide a plurality of bistable flip-flops 12 associated with integrating systems 31 for cooperation with predetermined groups of cylinders. The definition of the duration of injection is then obtained by a single system including a relaxation oscillator 29 and a signal-shaping system 30.

Figure 3:
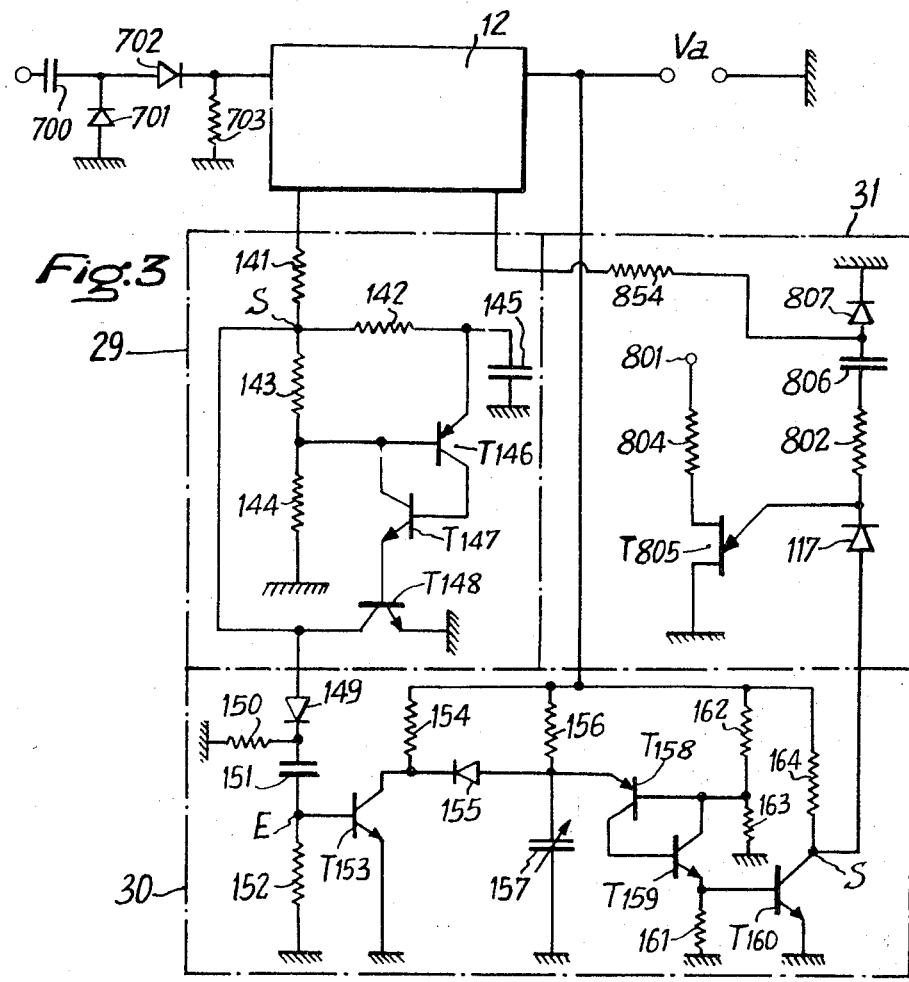
FIG. 3 is an electronic wiring diagram corresponding to FIG. 1, incorporating the details of the delay means.

FIG. 3 is an electronic wiring diagram of the whole arrangement according to FIG. 1 in which the relaxation oscillator 29, the signal-shaping system 30 and the integrating system 31 are illustrated in detail. The pulse generator 17 which is not illustrated in FIG. 3 transmits its positive injection-triggering signal to the conventional bistable flip-flop 12 through the condenser 700 and the diode 702 while a further diode 701 is provided for discharging the condenser 700 and a resistance 703 is adapted to ground the triggering signal. The relaxation oscillator 29 is fed by the bistable flip-flop 12 through a resistance 141 forming with the resistances 143 and 144 a voltage-divider. The point S connecting the resistances 141 and 143 is connected with a condenser 145 through a resistance 142, the above-mentioned connecting point S forming also the output for the oscillator pulses. Three transistors T146, T147, T148 are connected in series, the emitter of the transistor T146 being connected with the point joining the resistance 142 with the condenser 145 while its base is connected with the point joining the resistances 143 and 144 and also with the collector of the transistor T147 and its collector is connected with the base of said transistor T147. The transistor T148 is connected through its base with the emitter of the transistor T147 and through its collector with the point S joining the resistances 141 and 143 while its emitter is grounded. The output S for the relaxation oscillator 29 thus constituted is connected with the input E of the signal-shaping system 30, constituted in the case illustrated by a monostable multivibrator of a special type, through the diode 149 and condenser 151, a resistance 150 being provided for discharging said condenser 151 after the passage of the signal.

The signal-shaping system 30 includes transistors T158, T159 and T160 connected in series, the base of the transistor T158 being fed with the voltage defined by the voltage divider constituted by the resistances 162 and 163 while the emitter of said transistor is connected with the supply of voltage Va through the resistance 156. A further connection is provided between the base of said transistor T158 and the collector of the transistor T159 and also between the collector of the transistor T158 and the base of the transistor T159. The emitter of T159 is grounded through resistance 161 and is connected with the base of transistor T160, the emitter of which is grounded and the collector of which is connected through resistance 164 to the voltage supply Va and forms the output S' of the signal-shaping circuit 30.

The duration of the rectangular signal generated at the output S' is defined by the resistance 156 and the variable condenser 157 connected between ground and the point joining said resistance 156 with the emitter of the transistor T158. The generation of said rectangular signal is obtained through the transistor T153 the base of which is connected with the input E of the signal-shaping circuit 30 while its emitter is grounded and its collector is connected on the one hand with the supply of voltage Va through resistance 154 and with the emitter of the transistor 158 through the diode 155.

The integrating system 31 is constituted by a grounded unijunction transistor T805 the second base of which is fed through the resistance 804 with a voltage applied at 801, said voltage varying with the auxiliary correcting parameters as defined by the sensors 21, 22, 23, 24 and 25. The emitter of said unijunction transistor T805 is grounded through a resistance 802, a condenser 806 and a diode 807 and it is also connected with the output S' of the signal-shaping system 30 through the diode 117. The signal defining the end of the injection is transmitted to the bistable flip-flop 12 through a resistance 854 connected with the point joining the diode 807 with the condenser 806.

The operation of said arrangement is as follows:

When the flip-flop 12 is triggered, condenser 145 is charged through resistances 141 and 142. The transistors T146, T147 and T148 are cut off at the same time since the voltage of the emitter of the transistor T146 is initially lower than that applied to the base of said transistor by the voltage-divider constituted by the resistances 141, 143 and 144. At the moment at which the voltage across the terminals of the condenser 145 rises slightly above the voltage applied to the base of transistor T146 the latter becomes conductive and consequently the transistors T147 and T148 also become conductive. This results in the voltage on the base of transistor T146 becoming practically equal to zero, which leads to the rapid discharge of condenser 145. Furthermore, transistor 148 make the voltage at the point S equal to zero whereby the frequencies of oscillation are very high even with comparatively high values for the voltage across the condenser 145. As soon as the condenser 145 has been entirely discharged, the transistors T146, T147, T148 are again cut off and the cycle begins over again. There is thus obtained at the output S of the oscillator a positive voltage which is rapidly reduced to zero each time the transistors T146, T147 and T148 become conductive. Thus, each time said voltage rises to the value Va, a positive pulse is applied to the base of the transistor T153 of the signal-shaping system 30 through the diode 149 and the condenser 151 whereby said transistor T153 becomes conductive. Now, the transistors T158, T159 and T160 are normally conductive as long as the transistor T153 is cut off since the current passing through the resistance 156 is sufficient for maintaining the transistors T158, T159 and T160 in a conductive condition. When the transistor T153 becomes conductive, the voltage applied to the emitter of the transistor T158 drops to a value which is substantially equal to zero. The maintaining current is cut off in the transistors T158, T159 and T160 which are consequently cut off and therefore the condenser 157 begins charging through the resistance 156 as soon as the transistor T153 is no longer conductive while the voltage applied to the emitter of the transistor T158 rises so that the latter becomes again conductive after a predetermined period defined by the values of the resistance 156 and of the condenser 157. During the period during which said condenser 157 is being charged, a positive rectangular signal appears at the output S' of the signal-shaping system 30, said signal being at the frequency of the relaxation oscillator 29 while its duration varies as provided by modifications in the capacity of the condenser 157.

The integrating current 31 the rectangular signals from circuit 30 which charge the condenser 806. When the latter reaches a voltage such that it is equal, except for an intrinsic coefficient, to the voltage at the point 801 feeding the unijunction transistor T805, the latter becomes suddenly conductive by an avalanche effect and the condenser 806 is then discharged. Consequently a negative pulse is applied to the bistable flip-flop 12 which is cut off and ends the preceding injection.

It is possible to show that with the circuit described, the duration of the rectangular signal at the output of bistable flip-flop 12 is equal to $$T = \frac{(R141 + R142) \, C145 \cdot R802 \cdot C806}{R156 \cdot C157}$$

Figure 5:
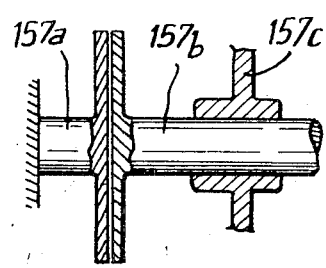
FIG. 5 illustrates diagrammatically a variable condenser incorporated with the delay system.

Now, if the variable condenser 157 includes a stationary plate 157a and a movable plate 157b guided in the support 157c (FIG. 5), the duration of the rectangular signal is a linear function of the spacing e between the two plates 157a and 157b.

$$T = \frac{(R141 + R142) \, C145 \cdot R802 \cdot C806}{R156 \cdot A \cdot S/e}$$

$$= \frac{(R141 + R142) \, C145 \cdot R802 \cdot C806}{R156 \cdot A \cdot S}$$

taking into account the fact that
$$C157 = A \cdot S/e$$

A being a factor of proportionality
S being the areas of the condenser plates 157a, 157b
e being the spacing between the said two plates The movable plate 157b may thus be controlled by an enclosed vacuum communicating with the intake manifold of the engine; the shifting of the diaphragm closing said vacuum may be extremely small which simplifies the construction of such an enclosed vacuum.

Figure 4:
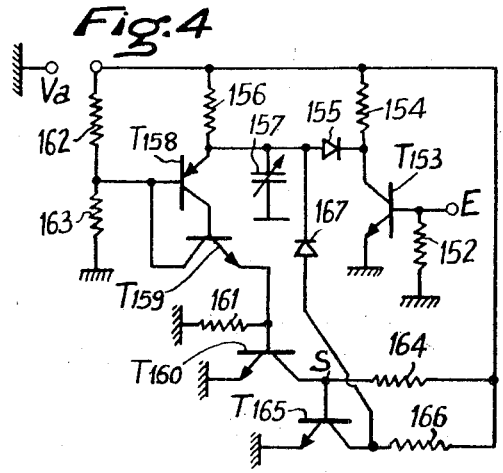
FIG. 4 illustrates a modification of one of the components of the delay means.

FIG. 4 illustrates a modification of the signal-shaping system 30. As a matter of fact, if it is desired to obtain rectangular pulses of a comparatively long duration while small capacities are used, it is necessary to increase the value of the resistance 156. Now, in such a case, an undesired deenergization of the arrangement may result. In order to prevent such a deenergization there is provided a further transistor T165 the base of which is connected with the output S' while its emitter is grounded and its collector is connected with the supply of voltage through a resistance 166 and also with the emitter of the transistor T158 through a diode 167. Said transistor 165 is conductive throughout the duration of the rectangular signal so that its collector is practically at a zero voltage and it cannot then feed the transistor T158 through the diode 167. Said transistor T165 is cut off throughout the duration of the conductive condition of the transistor T158 and is maintained in said condition by the resistance 166 which may be very small.

What I claim is:

1. In an internal combustion engine provided with a plurality of fuel injectors, an arrangement for controlling the injection of fuel, comprising a bistable flip-flop, a pulse generator controlled by the engine for controlling the operation of the flip-flop at a rate defined by the speed of rotation of the engine to make said flip-flop produce a start of injection signal, a relaxation oscillator adapted to produce high frequency pulses of fixed frequency, a system adapted to transform said pulses into a train of rectangular pulses at said fixed frequency, means controlled by at least one parameter governing the operation of the engine for defining the duration of said rectangular pulses, an integrating system adapted to integrate said rectangular pulses, means controlled by additional operative parameters of said engine and adapted to trigger the integrating system when the integrated amplitude has reached a predetermined level to thereby make the flip-flop produce an end-of-injection signal.

2. An arrangement as claimed in claim 1 wherein said oscillator is connected to said flip-flop so that the oscillator is started by said beginning-of-injection signal.

3. An arrangement as claimed in claim 1 further comprising an AND gate connected between said pulse-transforming system and said integrating system, means whereby the flip-flop opens said AND gate at each beginning-of-injection signal and closes said AND gate at each end-of-injection signal and means continuously energizing said relaxation oscillator so that the pulse transforming system continuously produces rectangular signals.

4. An arrangement as claimed in claim 1 wherein the oscillator includes a grounded condenser, two first resistances connected between said condenser and the flip-flop, a first transistor the emitter of which is connected with the condenser, two further resistances grounding the connecting point between the two first resistances the connecting point between said further resistances being connected with the base of said first transistor, a second transistor the collector of which is connected with the base of said first transistor and the base of which is connected with the collector of said first transistor and a third transistor the base of which is connected with the emitter of the second transistor and means connecting the connecting point between the two first resistances, the collector of the third transistor and the pulse transforming system, the emitter of the third transistor being grounded.

5. An arrangement as claimed in claim 1 wherein said pulse transforming system comprises a monostable multivibrator including a first, second and third transistor, a supply of voltage, a voltage divider constituted by two resistances in series between said supply of voltage and ground, the point connecting said two resistances being connected with the base of the first transistor and with the collector of the second transistor, a third resistance connecting the emitter of the first transistor with the supply of voltage, a connection between the collector of the first transistor and the base of the second transistor, a connection between the emitter of the second transistor and the base of the third transistor, a fourth resistance grounding the emitter of the second transistor, a lead grounding the emitter of the third transistor, a fifth resistance connecting the collector of the third transistor with the supply of voltage, a condenser one terminal of which is fed by said oscillator, a fourth transistor the base of which is connected with the second terminal of said condenser and the emitter of which is grounded, a sixth resistance grounding the base of the fourth transistor, a seventh resistance connecting the collector of the fourth transistor with the supply of voltage, and variable circuit means connected with the emitter of the first transistor and with the collector of the fourth transistor and controlled by said parameter governing the operation of the engine.

6. An arrangement as claimed in claim 5 wherein said adjustable circuit means comprises a condenser having two plates the spacing of which is controlled by said parameter governing the operation of the engine.

7. An arrangement as claimed in claim 5 wherein said adjustable circuit means is connected with the emitter of the first transistor and with the collector of the fourth transistor and is controlled by said parameter governing the operation of the engine and further including a fifth transistor the emitter of which is grounded, the base of which is connected with the collector of the third transistor, a diode connecting the collector of the fifth transistor with the emitter of the first transistor and a further resistance connecting said collector of the fifth transistor with the supply of voltage.

* * * * *

UNITED STATES PATENT OFFICE
CERTIFICATE OF CORRECTION

Patent No. 3,645,240     Dated February 29, 1972

Inventor(s) Louis A. Monpetit

It is certified that error appears in the above-identified patent and that said Letters Patent are hereby corrected as shown below:

Column 4, line 69, " = (R141 + R142) C145 · R802 · C806" should be -- = (R141 + R142) C145 · R802 · C806 · e --.

Signed and sealed this 17th day of October 1972.

(SEAL)
Attest:

EDWARD M. FLETCHER, JR.
Attesting Officer

ROBERT GOTTSCHALK
Commissioner of Patents